(12) United States Patent
Liu et al.

(10) Patent No.: US 8,279,735 B1
(45) Date of Patent: Oct. 2, 2012

(54) REPRODUCING SYSTEM FOR MEDIUMS AND METHOD FOR IDENTIFYING DIGITAL DATA OF THE MEDIUMS AND REPRODUCING THE SAME

(75) Inventors: Ming-Hsun Liu, Taipei (TW);
Chung-Hsuan Tsai, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 0 days.

(21) Appl. No.: 13/084,073

(22) Filed: Apr. 11, 2011

(51) Int. Cl.
*G11B 7/28* (2006.01)
(52) U.S. Cl. ...................................... 369/84; 369/53.31
(58) Field of Classification Search .................... 369/84, 369/30.05, 47.12, 53.31; 711/112–114, 161, 711/165
See application file for complete search history.

(56) References Cited

U.S. PATENT DOCUMENTS

| | | | |
|---|---|---|---|
| 6,226,241 B1 * | 5/2001 | D'Amato et al. | 369/47.15 |
| 6,529,452 B2 * | 3/2003 | Tabuchi et al. | 369/84 |
| 6,560,174 B1 * | 5/2003 | Takenaka | 369/47.12 |
| 7,196,986 B2 * | 3/2007 | Hayakawa et al. | 369/84 |
| 2004/0035934 A1 * | 2/2004 | Miyazawa et al. | 235/454 |
| 2006/0044969 A1 * | 3/2006 | Kudo et al. | 369/47.12 |
| 2007/0078948 A1 * | 4/2007 | Julia et al. | 709/217 |
| 2007/0286049 A1 * | 12/2007 | Sasaki | 369/84 |
| 2009/0060457 A1 * | 3/2009 | Mizumori | 386/96 |
| 2011/0249543 A1 * | 10/2011 | Kobayashi et al. | 369/84 |
| 2011/0255389 A1 * | 10/2011 | Kudo | 369/84 |

* cited by examiner

*Primary Examiner* — Thang Tran
(74) *Attorney, Agent, or Firm* — Muncy, Geissler, Olds & Lowe, PLLC

(57) ABSTRACT

A method for identifying digital data and reproducing the same by executing a software program stored in a memory of a computer is disclosed. The method includes: reading a plurality of source mediums; identifying digital data of the plurality of source mediums; saving the digital data as a temporary file; receiving a request for selecting a target medium, wherein the target medium is used for storing the digital data of the plurality of source mediums; determining a quantity of the target medium to be used for writing according to the size of the digital data and the size of the target medium; and writing the digital data of the plurality of source mediums into the target medium.

6 Claims, 8 Drawing Sheets

REPRODUCING SYSTEM FOR MEDIUMS AND METHOD FOR IDENTIFYING DIGITAL DATA OF THE MEDIUMS AND REPRODUCING THE SAME

BACKGROUND OF THE INVENTION

1. Field of the Invention

The present invention relates to a reproducing system for mediums and a method for identifying digital data of the mediums and reproducing the same.

2. Description of the Related Art

Digital storage of data has been in use for decades. Usually, digital data are stored in different types of storage mediums, such as MO (magnetic optical) discs, CDs (compact discs), LDs (laser discs), DVDs (digital versatile discs) or BDs (blue ray discs). Due to the development of different types of computers, the specifications of the mediums have to comply with the different generations of computers. The various mediums employ different compression technologies, so different types of mediums can store different amounts of digital data.

Most digital storage mediums are made for storing digital data that is read-only. Furthermore, almost every medium has limitations on its lifetime. When digital data is stored in a medium for longer than the lifetime, the digital data may become unreadable. As a result, users need to periodically re-store their digital data in a new medium to avoid data loss.

In order to save space, users may wish to use a disk with better compression to replace the old one when re-storing the digital data. For example, generally, one BD can store more than 25 GB of digital data, while one DVD can store 5 GB digital data. Thus, the user may want to use one BD to replace five DVDs when re-storing the data.

After re-writing the digital data into alternative mediums, users may not be able to identify the content of the mediums from the outward appearance of the mediums. Thus, traditionally, it is required to have a label on the surface of a medium for users to identify the content of the medium. However, if a user needs to backup his/her digital data by re-storing it into a new medium, the user may need a label printer to apply a label on the surface of the medium. Often, the description on the label, which is very short, has a limited amount of information. If the user needs an index to show the digital data content and the corresponding label, he/she has to build such an index manually.

Therefore, there is a need to provide a reproducing system for mediums and a method for identifying digital data and reproducing the same.

SUMMARY OF THE INVENTION

It is an object of the present invention to provide a reproducing system for mediums. The reproducing system can automatically identify digital data stored in the old mediums and write the digital data into a new medium.

It is another object of the present invention to provide a method for identifying digital data and reproducing the same by executing a software program stored in a memory of a computer.

To achieve the abovementioned objects, the present invention provides a reproducing system for mediums comprising a reading module, an identifying module connected with the reading module, a saving module connected with the identifying module, a receiving module connected with the identifying module, a determining module connected with the identifying module and the receiving module, and a writing module connected with the determining module and the saving module.

The reading module is used for reading a plurality of source mediums. The identifying module is used for identifying digital data of the source mediums. The saving module is used for saving the digital data as a temporary file. The receiving module is used for receiving a request to select a target medium, wherein the target medium is used for storing the digital data of the source mediums. The determining module is used for determining a quantity of the target medium. Furthermore, the digital data size of the mediums can also be identified by the identifying module, and the quantity of the target medium can be determined according to the size of the digital data and the size of the target medium. The writing module is used for writing the digital data of the plurality of source mediums into the target medium.

In a preferred embodiment, the reproducing system for mediums further comprises a building module connected with the receiving module, the identifying module, and the saving module, respectively, for building an index database of the digital data. In this embodiment, the index database comprises a file name, a filename extension, a size, a date, a time, an attribute, a type, and a remark. The plurality of source mediums comprises a CD, a DVD, and a BD.

In addition, the present invention further provides a method for identifying digital data and reproducing the same by executing a software program stored in a memory of a computer, the method comprising:

S1: reading a plurality of source mediums;
S2: identifying digital data of the plurality of source mediums;
S3: saving the digital data as a temporary file;
S4: receiving a request for selecting a target medium, wherein the target medium is used for storing the digital data of the plurality of source mediums;
S5: determining a quantity of the target medium to be used for writing according to the size of the digital data and the size of the target medium; and
S6: writing the digital data of the plurality of source mediums into the target medium.

In a preferred embodiment, the method further comprises:
S7: building an index database of the digital data after step 4.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1A:
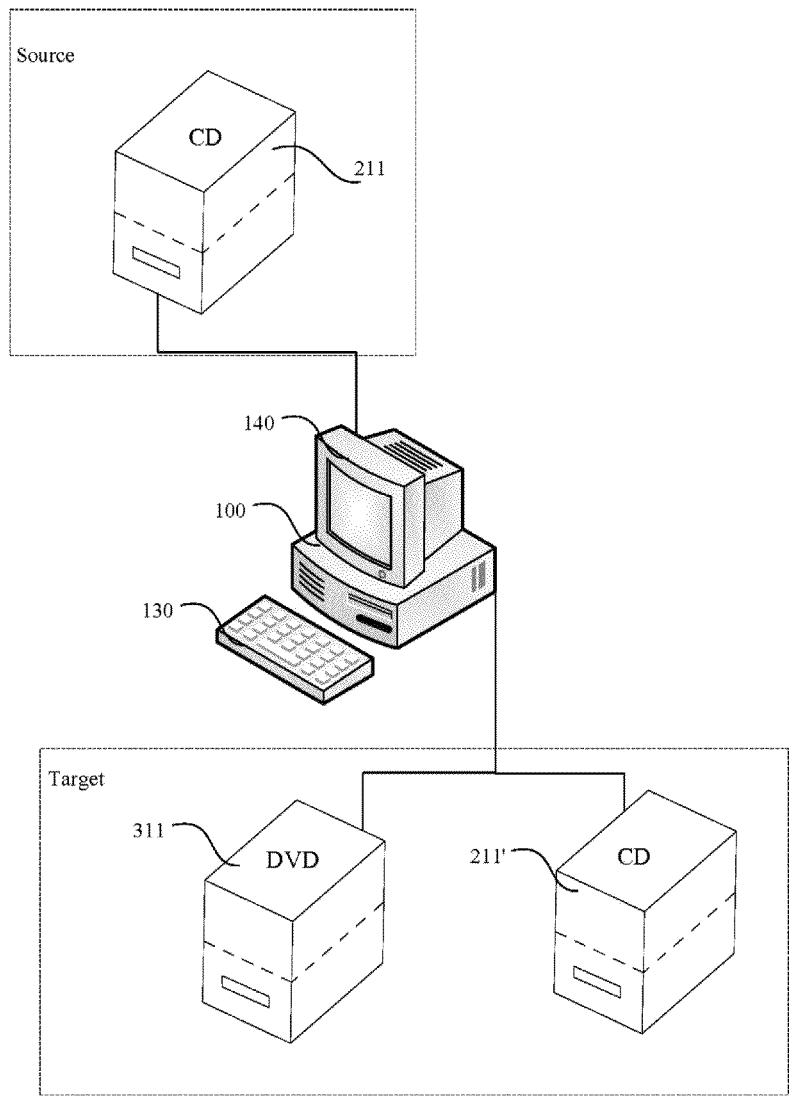
FIG. 1A and FIG. 1B illustrate an environmental schematic drawing according to an embodiment of the present invention.

Please refer to FIG. 1A, which illustrates an environmental schematic drawing according to an embodiment of the present invention, for the following paragraphs. A user utilizes a computer 100 to execute the method of the present invention. The computer 100 is connected with a source medium processing device 211 and two different destination medium processing devices 311 and 211' for the user to select. For example, the source medium processing device 211 may be a CD processing device, the destination medium processing device 311 can be a DVD processing device, and the destination medium processing device 211' can be a CD processing device. Thus, when the user needs to backup his/her old CDs, the user may use the method and the system of the present invention to copy the digital data of the old CDs into the destination medium processing device. The source medium processing device may be an MO reader, a CD processing device, a DVD processing device, a BD processing device, or a multi-functional processing device. Similarly, the destination medium processing device may be an MO reader, a CD processing device, a DVD processing device, a BD processing device, or a multi-functional processing device. Thus, the figures are for illustration only, not for limiting the present invention.

Figure 1B:
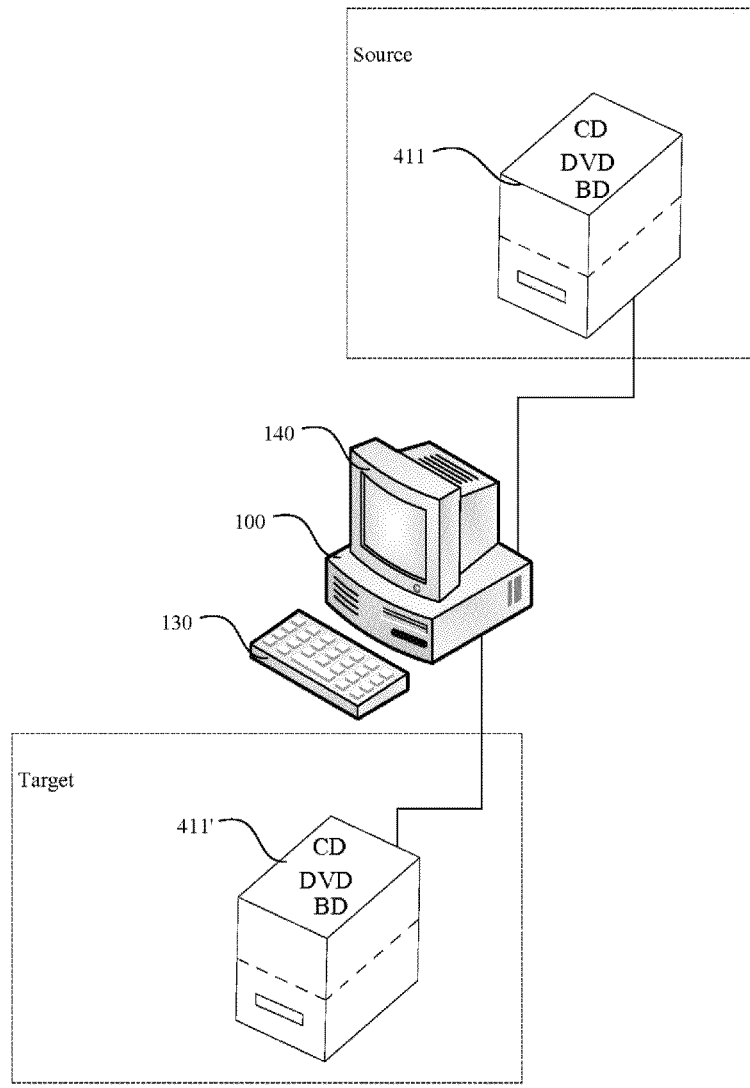

There are many kinds of medium processing devices. Thus, the user may use a multi-function processing device 411 to process or to read the old mediums (such as CDs or DVDs). For example, as shown in FIG. 1B, the user may use the multi-functional processing device 411, for example, to reproduce his/her old DVDs into CDs and DVDs through multi-function processing device 411'.

Figure 2:
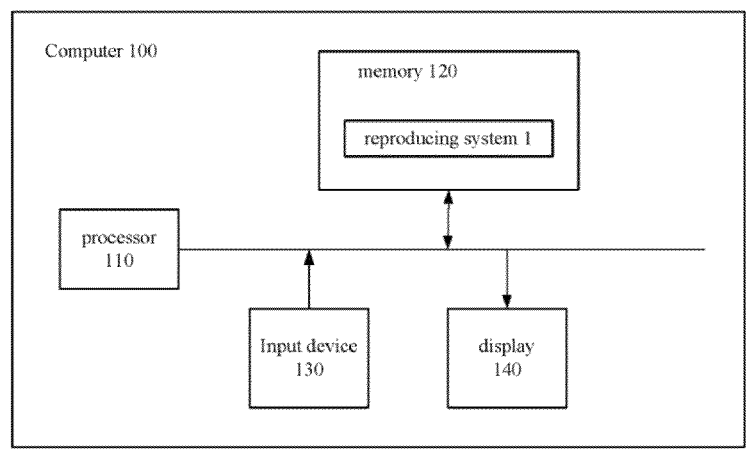
FIG. 2 illustrates a structure of a computer according to the present invention.

As shown in FIG. 2, the computer 100 mainly comprises a processor 110 and a memory 120. The memory 120 stores a reproducing system 1 that can be a software program. In the present invention, the processor 110 executes the reproducing system 1 so as to generate and perform the steps of the present invention.

Figure 3:
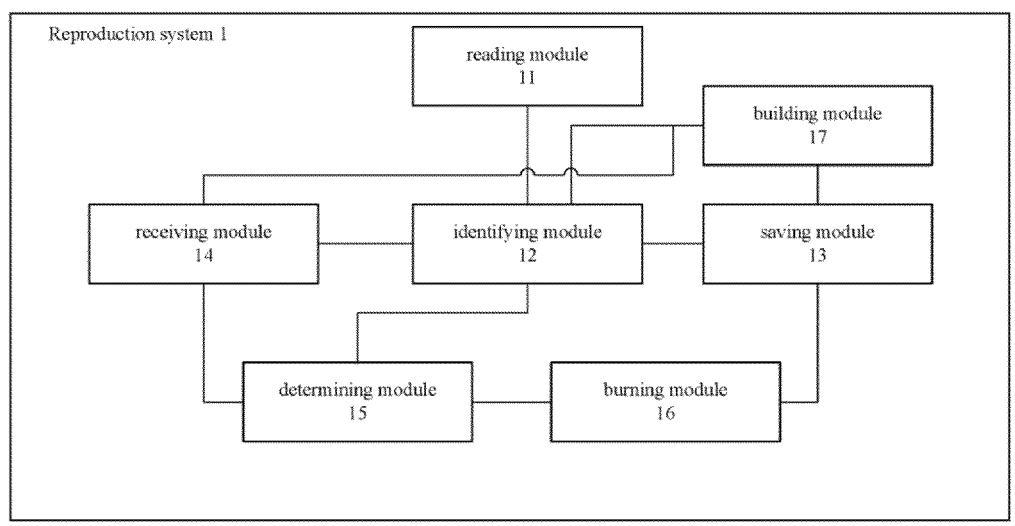
FIG. 3 illustrates a block diagram according to the reproducing system of the present invention.

Please refer to FIG. 3. The reproducing system 1 mainly comprises a reading module 11, an identifying module 12 connected with the reading module 11, a saving module 13 connected with the identify module 12, a receiving module 14 connected with the identify module 12, a determining module 15 connected with the identify module 12 and the receiving module 14, and a writing module 16 connected with the determining module 15 and the saving module 13.

The reading module 11 is used for reading a plurality of source mediums. For example, a user may use the source medium processing device 211 to read his/her mediums. The identifying module 12 is used for identifying digital data of the plurality of source mediums. The saving module 13 is used for saving the digital data as a temporary file. Since the technical details of the identifying module 12 and saving module 13 are known to those skilled in the art, we omit the description. The receiving module 14 is used for receiving a request to select a target medium, wherein the target medium is used for storing the digital data of the plurality of source mediums. The determining module 15 is used for determining a quantity of the target medium. The digital data size of the mediums can be identified by the identifying module 12, and the quantity of the target mediums can be determined according to the size of the digital data of source mediums. The writing module 16 is used for writing the digital data of the plurality of source mediums into the target medium. Thus, the source mediums are read by the source medium processing device 211, and the target mediums are read by the target medium processing device 311. According to the present invention, the user may select a specific medium that differs from the source mediums for reproduction.

In a preferred embodiment, the reproducing system 1 further comprises a building module 17 connected with the receiving module 14, the identifying module 12, and the saving module 13 for building an index database of the digital data. In a preferred embodiment, the index database comprises a file name, a filename extension, a size, a date, a time, an attribute, a type, and a remark.

Figure 4:
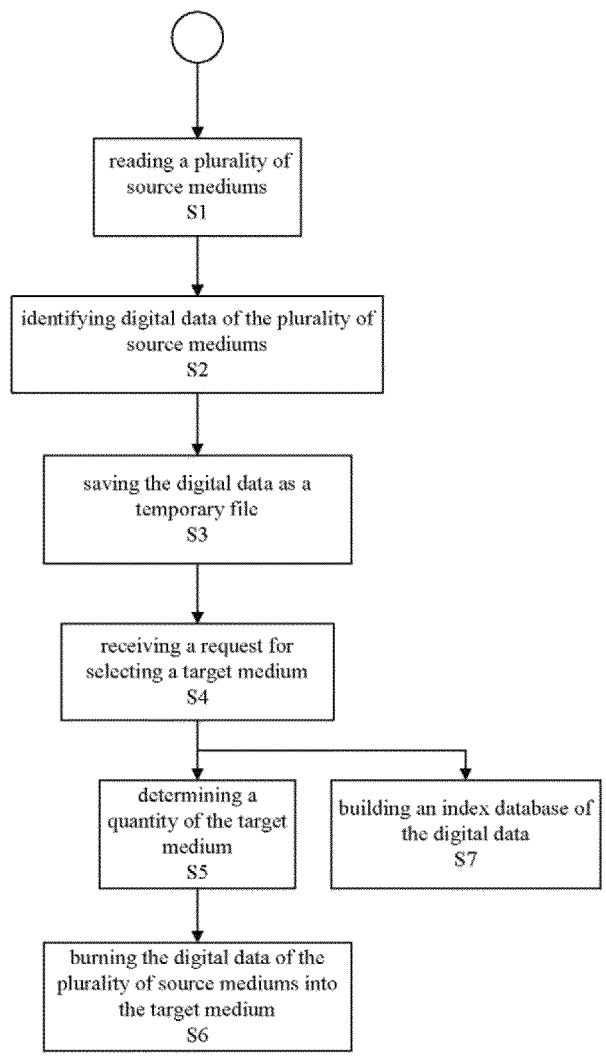
FIG. 4 shows a flow chart according to the method of the present invention.

The present invention also provides a method for identifying digital data and reproducing the same by executing a software program stored in a memory of a computer. Please refer to FIG. 4, which shows a flow chart of the method according to the present invention.

S1: reading a plurality of source mediums. For example, a user may use the source medium processing device 211 (as shown in FIG. 1B) to read his/her source mediums. The source mediums may need to be reproduced with different types of mediums.

S2: identifying digital data of the plurality of source mediums. As described above, the identifying module 12 (as shown in FIG. 3) can be used to identify the digital data. The digital data size of the source mediums can also be identified by the identifying module 12.

S3: saving the digital data as a temporary file. The saving module 13 in FIG. 3 can be used to save the digital data as the temporary file, wherein the temporary file is to be written into another medium.

Figure 5:
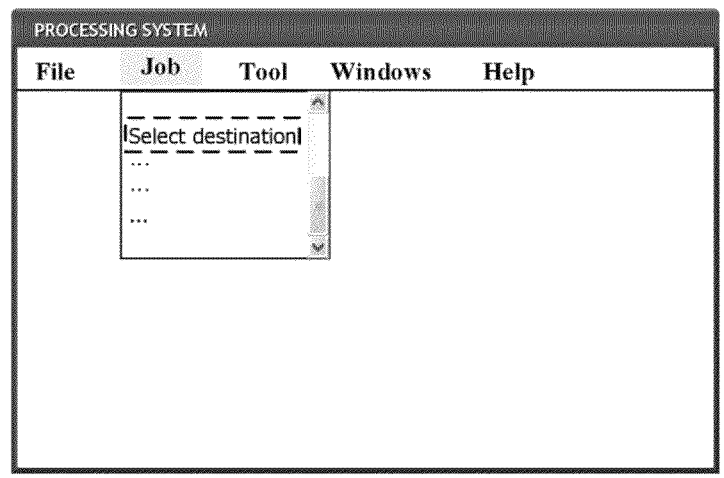
FIG. 5 and FIG. 6 illustrate interfaces according to one example of the present invention.
Figure 6:
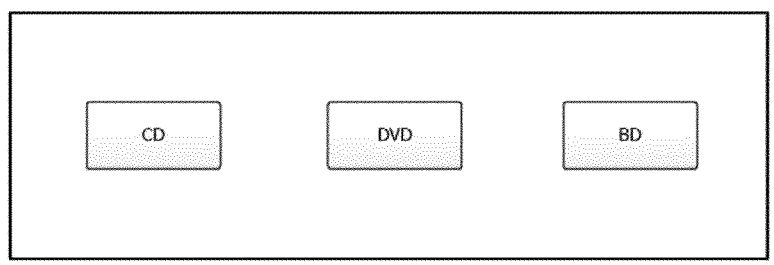

S4: receiving a request for selecting a target medium, wherein the target medium is used for storing the digital data of the plurality of source mediums. For example, the user can use an input device 130 (as shown in FIG. 2) to select the target medium through an interface displayed on a display 140 (as shown in FIG. 2). Please refer to FIG. 5 and FIG. 6, which show an example of interfaces. When the user selects a destination, as shown in FIG. 5, the user can select a specific type of target medium through the interface shown in FIG. 6. For example, the specific type of target medium may comprise a CD, DVD, or BD.

S5: determining a quantity of the target medium to be used for writing according to the size of the digital data and the size of the target medium. The identifying module 12 can identify the digital data size of the source medium, so the determining module 15 can determine the quantity of target medium that will be needed for writing the digital data of the source medium.

Figure 7:
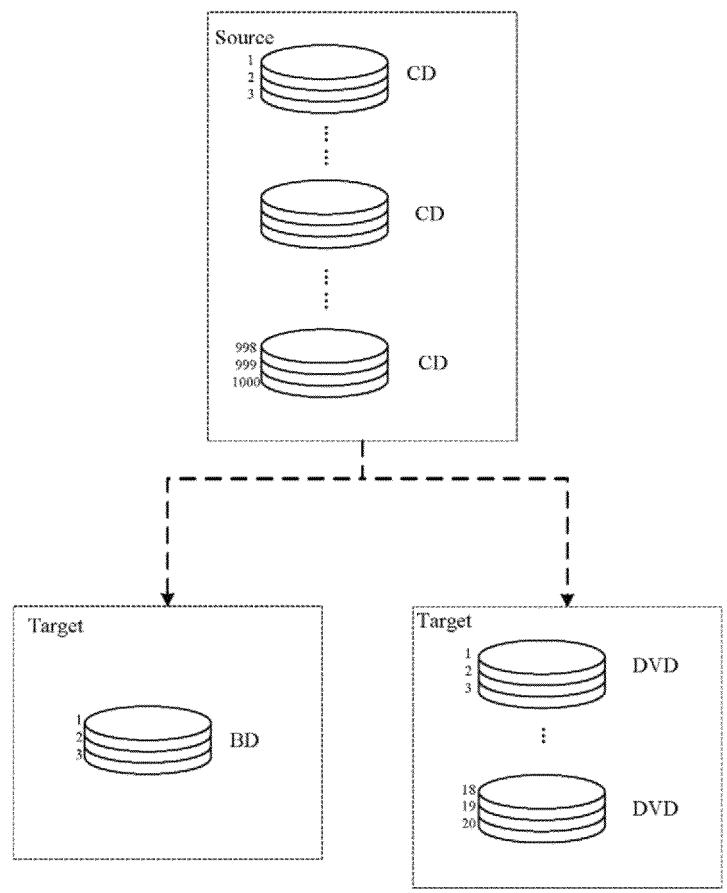
FIG. 7 illustrates quantity differences between source mediums and destination mediums.

S6: writing the digital data of the plurality of source mediums into the target medium. For example, as shown in FIG. 7, the user may use the method of the present invention to reproduce the digital data of the source mediums into the target medium. In this example, there are 1,000 CDs of digital data to be reproduced into 3 BDs and 20 DVDs. Thus, the space for storing the mediums after reproduction can be reduced dramatically. In this example, the method of the present invention can control the specific one multi-functional target processing device or two different target processing devices to write data onto the BDs and DVDs.

Figures 8A, 8B:
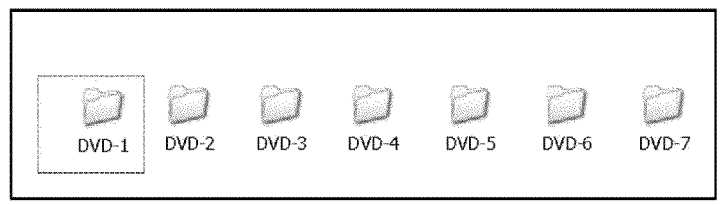
FIG. 8A and FIG. 8B illustrate interfaces according to one example of the present invention.

In a preferred embodiment, the method further comprises:

S7: building an index database of the digital data after step 4. The building module 17 in FIG. 3 can be used to build an index database of the digital data. As shown in FIG. 8A and FIG. 8B, according to the target mediums, folders can be displayed after building the index database. When the folder is clicked, a file name, a filename extension, a size, a date, a time, an attribute, a type, and a remark can be displayed. Thus, it is very convenient for the user to know the content of the target mediums after reproducing the digital data of the source mediums. For example, if the user uses the method of the present invention to reproduce the digital data of the source medium into the target mediums with a label of "DVD-1", "DVD-2", etc., the index database in the computer may comprise folders named "DVD-1", "DVD-2", etc. Thus, it will be easy for the user to find the target medium from the index database.

Although the present invention has been explained in relation to its preferred embodiments, it is to be understood that many other possible modifications and variations can be made without departing from the spirit and scope of the invention as hereinafter claimed.

What is claimed is:

1. A reproducing system for mediums comprising:
   a reading module for reading digital data from a source medium;
   an identifying module connected with the reading module for identifying the digital data read from the source medium;
   a saving module connected with the identifying module for saving the digital data identified by the identifying module as a temporary file;
   a receiving module connected with the identifying module for receiving a request to select a target medium, wherein the target medium is used for storing the digital data read from the source medium;
   a determining module connected with the identifying module and the receiving module respectively for determining a quantity of the target medium to be used for writing according to the size of the identified digital data and the size of the target medium; and
   a writing module connected with the determining module and the saving module for writing the saved digital into the target medium in according to the determined quantity.

2. The reproducing system for mediums as claimed in claim 1, further comprising a building module connected with the receiving module, the identifying module, and the saving module for building an index database of the digital data.

3. The reproducing system for mediums as claimed in claim 2, wherein the index database comprises a file name, a filename extension, a size, a date, a time, an attribute, a type, and a remark.

4. The reproducing system for mediums as claimed in claim 1, wherein the source medium comprises a CD, a DVD, or a BD.

5. A method for identifying digital data and reproducing the same by executing a software program stored in a memory of a computer, the method comprising:
   reading digital data from a source;
   identifying the digital data read by the reading step from the source medium;
   saving the digital data identified by the identifying step as a temporary file;
   receiving a request for selecting a target medium, wherein the target medium is used for storing the digital data read from the source medium;
   determining a quantity of the target medium to be used for writing according to the size of the identified digital data and the size of the target medium; and
   writing the saved digital data into the target medium in according to the determined quality quantity.

6. The method as claimed in claim 1 further comprising:
   building an index database of the digital data after the step of receiving the request for selecting a target medium.

* * * * *